July 21, 1959 F. ROSTRON 2,895,589
EGG HANDLING PLANTS
Filed June 12, 1958 2 Sheets-Sheet 1
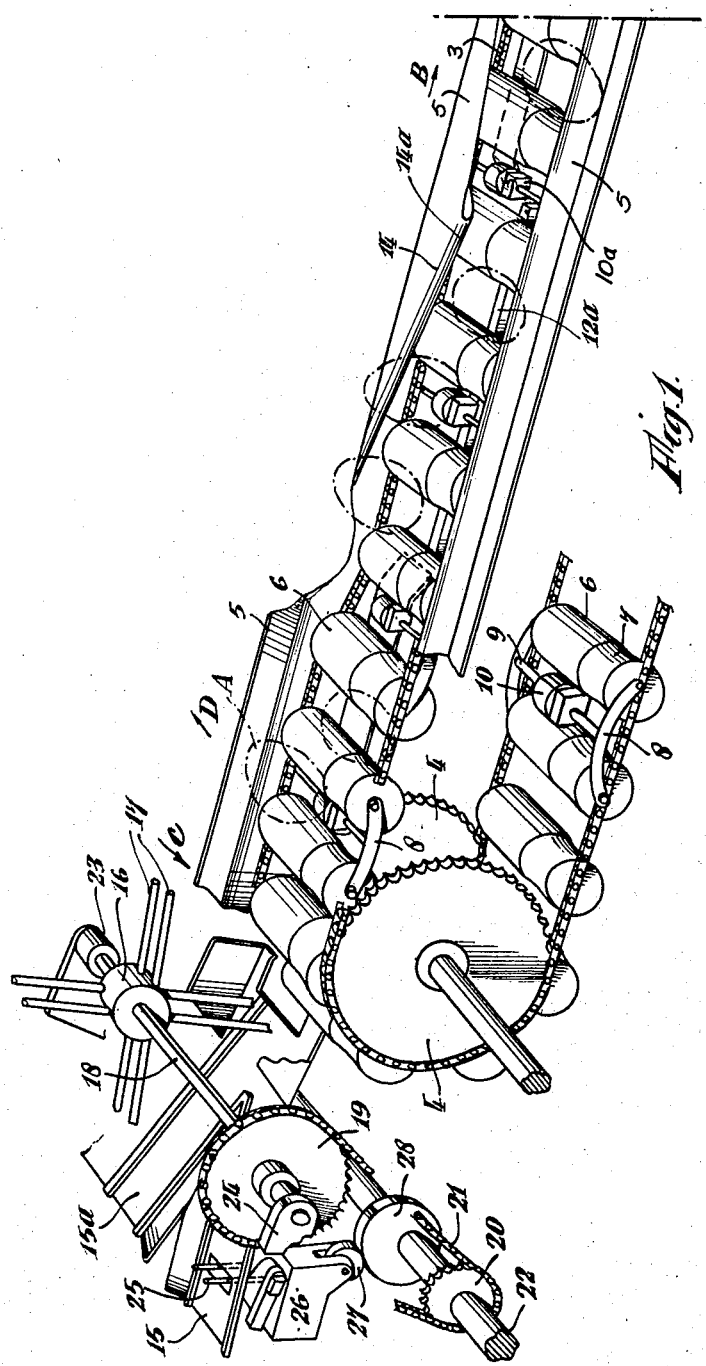

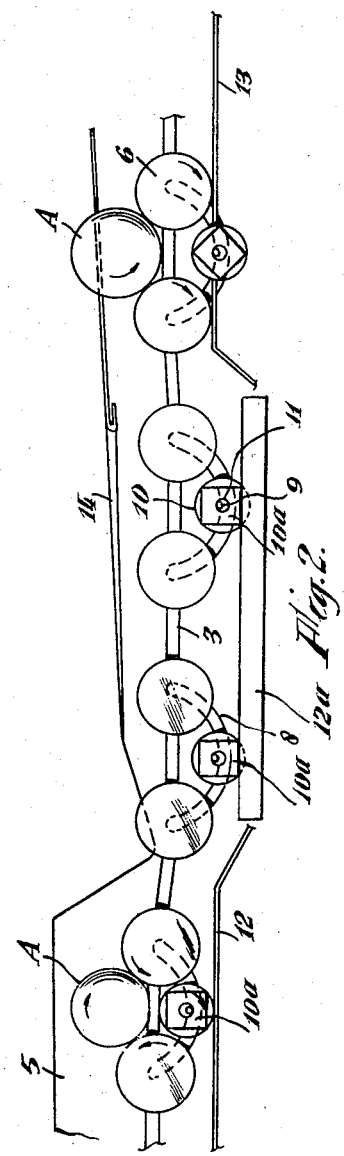

United States Patent Office 2,895,589
Patented July 21, 1959

2,895,589

EGG HANDLING PLANTS

Frank Rostron, Westbury, England, assignor to Newman, Hender and Company, Limited, Trowbridge, England, a British company Application June 12, 1958, Serial No. 741,576

Claims priority, application Great Britain June 24, 1957

7 Claims. (Cl. 198—33)

This invention relates to egg handling plant and is particularly concerned with the orientation or positioning of eggs to facilitate their packing in such a way that the eggs are all presented one way generally with the large end up when arranged in the standard form of egg tray. The present day conditions of mechanically handling eggs provides for their grading by well known types of machine from which they are delivered in separate and distinct batches of differing weights per unit egg. From the egg grading machines, the eggs are gathered and packed into trays which are eventually boxed and distributed to retailers. The packing of the trays has hitherto been accomplished in general by manual labour, the packers taking the eggs from the batches as graded by weight by the egg grading machine and filling the trays by hand, taking care to ensure that the eggs are placed in the tray with the large end uppermost, an accepted and desirable practice to improve the keeping qualities of the eggs, as when so arranged the air chamber of each of the eggs is at the top of the tray and the small ends of the eggs are at the base of the tray recesses.

The object of the present invention is mechanism for receiving the eggs from an egg grading machine and so orientating them that they are then presented to the tray packers or a tray packing machine with the large end of the eggs facing the same direction with the long axes of the eggs substantially in parallelism. By this means the packing of the eggs, where done manually or by a machine into an egg tray, is considerably facilitated saving time and labour and resulting in trays of eggs when completely filled having the large ends of the eggs uppermost as required by present day egg handling conditions.

According to the invention a method of handling eggs whereby they are oriented to a position of similarity consists in depositing the eggs one by one between rotatable rollers with the long axis of the egg substantially parallel with the axes of the rollers, moving said rotating rollers bodily in a direction transverse to said axes to carry said eggs forward against a guide surface, and stopping the rotation of the rollers, whereby the eggs are moved past said guide surface and thereby turned over about their long axis.

The invention further comprises apparatus for carrying into effect the method aforesaid comprising an endless conveyor formed of a continuous series of rollers rotatably mounted on axes transverse to the line of travel of the conveyor means for rotating the rollers each in the same direction at the commencement of travel of the upper run of the conveyor, means for maintaining the rollers in stationary, non-driven condition during a following part of their travel and means for rotating said rollers of all pairs in the opposite direction towards the delivery end of the conveyor, whereby each egg is caused to move laterally to one end or the other of the pair of rollers in which it rests determined by the position in which the egg is initially placed therebetween, complementary retaining means formed at one end of the pairs of roller means, for example a guide surface or cam disposed adjacent the conveyor where the rollers are stationary during the travel of the conveyor, adapted to reverse the position of eggs moved to the other end of the pairs of rollers, resulting in such eggs moving to the retaining means of the pair of rollers when the latter are rotated in the opposite direction to the rotation which appertained at the commencement of the travel on the upper run of the conveyor at the end of the travel of the upper run of the conveyor.

It will be appreciated that advantage is taken of the fact that an egg when freely rolled will veer left or right, the rolling line of the egg, that is to say an imaginary line circumferential to the long axis of the egg and on which the egg rolls, places the egg out of balance or is thereby biased so that the tendency of the egg is to roll to one side or the other of a straight line path due to such biasing. It follows, therefore, if an egg is placed between rollers rotating in the same direction and thus caused to rotate, the egg will move to the left hand or the right hand end of the rollers determined by its bias and how placed centrally between the rollers. It is this particular characteristic of egg movement that is the basis of operation of a machine according to the present invention.

In order that the invention may be clearly understood and readily carried into effect, reference is directed to the accompanying drawings, wherein:

Figure 1 is a perspective view of an egg orientation machine according to the invention and shown in relation to a pair of delivery chutes assumed to be associated with an egg grading machine (not shown).

Figure 2 is a diagrammatic side elevational view showing the operation of the rollers forming a conveyor as illustrated in Figure 1.

Referring to the drawings, there is provided an endless conveyor consisting of a pair of chains 3 arranged in parallelism and driven by sprockets of which one end pair 4 are shown. The conveyor moves between guide members 5, mounted in a suitable frame and the chains 3 have rotatably mounted thereon and transversely thereto pairs of rollers 6 and between each pair of which an egg A is deposited by mechanism hereinafter described. The rollers 6 are of cylindrical form for the greater part of their length and are provided with a neck portion 7 at one end, so that complementary neck portions on adjacent rollers constituting the pair of rollers 6 form a lodgment for an egg. Each pair of rollers is connected at both ends by an arcuate link 8, between which is supported centrally a spindle 9 integral therewith and supporting loosely a roller 10 provided with a square bearing block 10a fixed thereto. The roller 10 has a central orifice 11 therethrough considerably larger than the diameter of the spindle 9, so that a certain amount of free play is permitted between roller and spindle. The roller 10 is engageable with the rollers 6 at certain periods during travel of the upper run of the conveyor in the direction of the arrow B from the egg receiving end thereof to the ejection end.

The rollers 6 are not disposed in pairs for any other reason than economy as the "contra"-rotating rollers 10 could be used between all the rollers 6.

Below the conveyor there are disposed ramps 12 and 12a and 13 so arranged that at the commencement of travel of the conveyor in the direction of the arrow B the rollers 10 are engaged with the ramp 12 and forced into contact with the rollers 6 to cause them to rotate both in the same direction and in so doing rotate an egg A placed between the rollers in a clockwise direction; continued movement of the conveyor carries the rollers 10 off the ramp 12 and as the rollers leave the ramp, the square bearing blocks 10a engage with the ramp 12a which causes rotary motion of the rollers to cease. During this period, the eggs are brought into contact with a guide surface 14 which presents a straight beaded edge 14a to the eggs, the straight edge lying partly across the conveyor and diagonally in relation to the line of travel thereof. The edge serves as a guide or cam by means of which the eggs are turned over and thus reversed in position endwise or in other words turned about their long axis. Further movement of the conveyor brings each pair of rollers 6 in turn into direct engagement with the ramp 13, the rollers 10 and blocks 10a being at this point inoperative and the egg then moves into the lodgment between the rollers provided by the neck portions 7 thereof with the proper end of the egg correctly presented.

The rollers 6 being driven in one direction at the commencement and in the opposite direction at the termination or delivery end of the conveyor produces a stationary, non-driven condition of the central or non-drive section of the conveyor which is necessary for the turn over of the eggs. This condition is implemented by the positive self locking action of the square bearing blocks against the ramp 12a.

The eggs are fed to the conveyor through an egg grading machine by way of a pair of chutes 15, 15a and run down the chutes until brought into engagement with a feed device 16 provided with a number of radially disposed pairs of fingers 17 which pass the eggs individually to the pairs of rollers 6. The feed device is mounted on a shaft 18 driven by sprockets 19 and 20 and chain 21 from a main drive shaft 22. The shaft 18 is mounted in bearings 23 and 24 which may form part of the delivery mechanism of an egg grading machine which as a rule delivers eggs in pairs of the same weight to be received by the chutes 15. In order that the delivery device 16 should receive only one egg at a time for delivery to the conveyor, escapement mechanism is provided consisting of a pair of pins 25 which are moved into the path of an egg arriving by the chute 15 to hold it there until an egg arriving by the chute 15a has been passed by the delivery device 16 to the conveyor. The pins 25 are mounted on a pivoted rocker 26 provided with a cam follower 27 co-operating with a cam 28 keyed to the shaft 22. It will be appreciated that the delivery device 16 is operated continuously to move the eggs one at a time as received from each chute 15 or 15a in turn to deposit an egg between each pair of complementary rollers 6 and that the escapement mechanism is operated step by step in synchronism therewith.

The feed device 16 is not essential to the invention as the eggs can be controlled and delivered direct by the escapement mechanism. When the machine is in operation, eggs are fed by the delivery device 16 to the conveyor and deposited sequentially one egg between each pair of rollers 6 during the travel of the conveyor. On the assumption that the eggs are positioned on the conveyor with the small end of the egg pointing either left or right of the line of travel of the conveyor, as will certainly be the case in practice, such position will decide the direction in which the egg will travel during the period the egg is being rotated by the rollers 6 during their rotational movement in the same direction, if the bias of the egg is towards the arrow C, the egg will travel in that direction until it comes to rest between the complementary neck portions 7 of the rollers 6 which form a lodgment therefor; if however, the small end of the egg is in the opposite direction as arrow D it will move in that direction and eventually be brought into engagement with the guide surface 14 when the travel of the conveyor brings the pair of rollers in which the egg is rotating to that part of its movement where the rollers are not being positively rotated. During the passage of the egg past the guide surface 14, it will, due to the shape of the surface bead 14a turn the egg over endwise until eventually it comes to rest between the complementary neck portions 7 of the pair of rollers in which it was received, so that during the final part of its journey when the rollers 6 are rotated in the same direction by contact with the ramp 13, the egg has now assumed a position with the small end thereof in the direction of the arrow C. It will thus be seen that eggs which are delivered to the conveyor in the right direction are not affected by the guide surface 14 but those which are delivered otherwise are reversed so that when they reach the delivery or outlet end of the conveyor, they are in the correct position and all eggs are in conformity ready to be packed into trays either manually or mechanically for example by the egg tray filling mechanism of copending application Serial No. 742,680.

What I claim and desire to secure by Letters Patent is:

1. Apparatus for orienting eggs comprising an endless conveyor, a continuous series of pairs of egg receiving rollers forming part of said conveyor and rotatably mounted on axes transverse to the line of travel of said conveyor means for rotating said egg receiving rollers each in the same direction at the commencement of travel of the upper run of the conveyor, means for maintaining said egg receiving rollers non rotative during a following part of their travel, means for rotating said rollers of all pairs in the opposite direction towards the delivery end of the conveyor, whereby each egg is caused to move laterally to one end or the other of the pair of rollers in which it rests determined by the position in which the egg is initially placed therebetween, complementary retaining means formed at and by one end of the pairs of rollers, a guide member disposed adjacent the conveyor to engage the eggs during the period the egg receiving rollers are non rotative during travel of the conveyor, said guide member reversing the end to end position of an egg brought into engagement with said guide member whereby such eggs move to the retaining means of the pair of rollers when the latter are rotated in the opposite direction to that appertaining at the commencement of the travel of the upper run of the conveyor.

2. Apparatus for handling eggs as claimed in claim 1 wherein the conveyor consists of a pair of chains arranged in parallelism, sprockets driving said chains, said rollers being of cylindrical form for the greater part of their length and provided with a neck portion at one end for the remainder of their length whereby complementary neck portions on adjacent rollers constitute a lodgement for an egg.

3. Apparatus for handling eggs as claimed in claim 1, and arranged below the conveyor, rollers carried by said pairs of egg receiving rollers and engageable with the latter through the intermediary of said ramps at stated intervals whereby the egg receiving rollers are caused to rotate both in one and the same direction and in so doing rotate an egg placed between the rollers in the opposite direction.

4. Apparatus for orienting eggs comprising an endless conveyor, a continuous series of pairs of egg receiving rollers forming part of said conveyor and rotatably mounted on axes transverse to the line of travel thereof, means for rotating said egg receiving rollers each in the same direction at the commencement of travel of the upper run of the conveyor, means for maintaining said egg receiving rollers non rotative during a following part of their travel, means for rotating said rollers of all pairs in the opposite direction towards the delivery end of the conveyor, whereby each egg is caused to move laterally to one end or the other of the pair of rollers in which it rests determined by the position in which the egg is initially placed therebetween, complementary retaining means formed at and by one end of the pairs of rollers, a guide member disposed adjacent the conveyor to engage the eggs during the period the egg receiving rollers are non rotative during travel of the conveyor, said guide member reversing the end to end position of an egg brought into engagement with said guide member whereby such eggs move to the retaining means of the pair of rollers when the latter are rotated in the opposite direction to that appertaining at the commencement of the travel of the upper run of the conveyor, an arcuate link connecting said pairs of egg receiving rollers at both ends, a spindle supported centrally of said links and integral therewith a roller mounted for lost motion on each said spindle, said roller having a square end co-operative with the means for maintaining said egg receiving rollers non-rotative.

5. Apparatus for orienting eggs comprising an endless conveyor, a continuous series of pairs of egg receiving rollers, forming part of said conveyor and rotatably mounted on axes transverse to the line of travel of said conveyor means for rotating said egg receiving rollers each in the same direction at the commencement of travel of the upper run of the conveyor, means for maintaining said egg receiving rollers non rotative during a following part of their travel, means for rotating said rollers of all pairs in the opposite direction towards the delivery end of the conveyor, whereby each egg is caused to move laterally to one end or the other of the pair of rollers in which it rests determined by the position in which the egg is initially placed therebetween, complementary retaining means formed at and by one end of the pairs of rollers, a guide member, a straight beaded edge on said guide member, said edge lying partly across the conveyor and diagonally in relation to the line of travel thereof, to engage the eggs during the period the egg receiving rollers are non rotative during travel of the conveyor, said guide member reversing the end to end position of an egg brought into engagement with said guide member whereby such eggs move to the retaining means of the pair of rollers when the latter are rotated in the opposite direction to that appertaining at the commencement of the travel of the upper run of the conveyor.

6. Apparatus for orienting eggs comprising an endless conveyor, a continuous series of pairs of egg receiving rollers forming part of said conveyor and rotatably mounted on axes transverse to the line of travel of said conveyor means for rotating said egg receiving rollers each in the same direction at the commencement of travel of the upper run of the conveyor, means for maintaining said egg receiving rollers non rotative during a following part of their travel, means for rotating said rollers of all pairs in the opposite direction towards the delivery end of the conveyor, whereby each egg is caused to move laterally to one end or the other of the pair of rollers in which it rests determined by the position in which the egg is initially placed therebetween, complementary retaining means formed at and by one end of the pairs of rollers, a guide member disposed adjacent the conveyor to engage the eggs during the period the egg receiving rollers are non rotative during travel of the conveyor, said guide member reversing the end to end position of an egg brought into engagement with said guide member whereby such eggs move to the retaining means of the pair of rollers when the latter are rotated in the opposite direction to that appertaining at the commencement of the travel of the upper run of the conveyor, an arcuate link connecting said pairs of egg receiving rollers at both ends, a spindle supported centrally of said links and integral therewith a roller mounted for lost motion on said spindle, said roller having a square end, a pair of ramps arranged below the conveyor and adapted to be engaged by said rollers to bring them into contact with said egg receiving rollers at stated intervals whereby the egg receiving rollers are caused to rotate both in the same direction and in so doing rotate an egg placed between the rollers in the opposite direction, said egg receiving rollers being driven in the opposite direction at the delivery end of the conveyor by engagement with said ramp, and held stationary during the medial part of the travel of the rollers.

7. Apparatus for handling eggs as claimed in claim 1, including a pair of egg delivery chutes mounted for operation at the entry end of the conveyor, a feed device comprising a number of radially disposed pairs of fingers adapted to passage the eggs from said chutes to the pairs of egg receiving rollers of said conveyor and escapement mechanism operable to control the delivery of eggs one by one from said feed device.

References Cited in the file of this patent

UNITED STATES PATENTS 2,296,645     Marsden _____ Sept. 22, 1942

FOREIGN PATENTS 777,330     France _____ Feb. 16, 1935